United States Patent

Masaki et al.

[11] Patent Number: 5,548,428
[45] Date of Patent: Aug. 20, 1996

[54] PROCESS FOR INJECTING FERROELECTRIC LIQUID CRYSTAL WITH INJECTION COMPLETED ABOVE ATMOSPHERIC PRESSURE

[75] Inventors: Yuichi Masaki, Kawasaki; Kenji Onuma, Isehara; Toshifumi Yoshioka, Hadano; Mutsuo Mitsui, Hachiohji, all of Japan

[73] Assignee: Canon Kabushiki Kaisha, Tokyo, Japan

[21] Appl. No.: 91,011

[22] Filed: Jul. 14, 1993

[30] Foreign Application Priority Data

Jul. 27, 1992 [JP] Japan .................................. 4-218823
Jul. 27, 1992 [JP] Japan .................................. 4-218824

[51] Int. Cl.⁶ .............................. G02F 1/13; G02F 1/1341
[52] U.S. Cl. .............................. 359/80; 359/62; 359/100
[58] Field of Search ........................... 359/62, 80, 100; 341/1, 7

[56] References Cited

U.S. PATENT DOCUMENTS

| | | | |
|---|---|---|---|
| 3,698,449 | 10/1972 | Sorkin et al. | 141/1 |
| 3,701,368 | 10/1972 | Stern | 141/1 |
| 3,960,534 | 6/1976 | Oates | 141/1 |
| 4,064,919 | 12/1977 | Stern et al. | 141/7 |
| 5,029,623 | 7/1991 | Brosig | 141/7 |
| 5,177,627 | 1/1993 | Ishiwata et al. | 359/68 |
| 5,193,019 | 3/1993 | Watanabe | 359/62 |
| 5,246,042 | 9/1993 | Farrell | 141/7 |
| 5,269,351 | 12/1993 | Yoshihara | 141/7 |
| 5,355,236 | 10/1994 | Mitsui | 359/62 |

FOREIGN PATENT DOCUMENTS

| | | | |
|---|---|---|---|
| 51-02982 | 1/1976 | Japan . | |
| 61-132928 | 6/1986 | Japan | 359/80 |
| 61-198219 | 9/1986 | Japan | 359/100 |
| 64-31118 | 2/1989 | Japan | 359/62 |
| 3-116011 | 5/1991 | Japan | 359/62 |

*Primary Examiner*—Anita Pellman Gross
*Attorney, Agent, or Firm*—Fitzpatrick, Cella, Harper & Scinto

[57] ABSTRACT

A ferroelectric liquid crystal panel is prepared by injecting a ferroelectric liquid crystal into a liquid crystal panel through a process including at least four steps, i.e., a first step of reducing a pressure and evacuating gas within the liquid crystal panel, a second step of applying the ferroelectric liquid crystal to an injection port of the liquid crystal panel, a third step of causing the liquid crystal to enter into the liquid crystal panel under an increasing pressure, and a fourth step of completing injection of the liquid crystal into the liquid crystal panel under an elevated pressure. In the process, the liquid crystal panel is held at a higher temperature in the first step than in the second step. As a result, it is possible to obtain a ferroelectric liquid crystal panel which contains a ferroelectric liquid crystal at a sufficiently high packing density, free from occurrence of voids even after standing at a low temperature and has a uniform alignment state over the entire panel area.

6 Claims, 3 Drawing Sheets

PROCESS FOR INJECTING FERROELECTRIC LIQUID CRYSTAL WITH INJECTION COMPLETED ABOVE ATMOSPHERIC PRESSURE

FIELD OF THE INVENTION AND RELATED ART

The present invention relates to a liquid crystal device, such as a display device, containing a liquid crystal showing a smectic phase, particularly a chiral smectic phase, at room temperature and particularly relates to a process for injecting a ferroelectric liquid crystal into a liquid crystal panel including pressure-reducing and heating steps.

In a conventional process for injecting a liquid crystal into a liquid crystal panel, the liquid crystal and the liquid crystal panel are held in a reduced-pressure vessel, the pressure in the vessel is reduced, the injection port of the panel is caused to contact the liquid crystal or the liquid crystal is applied to the injection port, and then the pressure within the vessel is restored to the atmospheric pressure to fill the panel with the liquid crystal (e.g., as disclosed in Japanese Utility Model Publication No. 51-2982). In this instance, the liquid crystal panel is frequently raised to an elevated temperature in order to complete gas-evacuation from within the liquid crystal panel.

Further, in the case of injection of a ferroelectric liquid crystal assuming a smectic phase at room temperature, as the liquid crystal in the smectic phase has a high viscosity unsuitable for injection, the injection is performed under a lower viscosity condition while the liquid crystal panel and the liquid crystal are held at a temperature higher than the temperature providing a smectic phase. In this case, it has been general to use a heated temperature providing an isotropic phase so as to more completely perform the gas evacuation or degassing from the panel and minimize the liquid crystal viscosity. In the injection step, the liquid crystal may cause a shrinkage at the time of restoring the panel to room temperature to result in a void. In order to obviate the problem, it has been generally performed to effect gradual cooling while providing a temperature difference to the panel.

In the conventional injection processes as described above, as illustrated in FIG. 5B, the liquid crystal 53 immediately after application onto the injection port is caused to enter up to an intermediate position as denoted by a numeral 53a within the panel even within a reduced-pressure vessel due to the capillary effect because of a low viscosity of the liquid crystal on application. Thereafter, the liquid crystal and the liquid crystal panel are returned to the atmospheric pressure to complete the injection, followed by sealing, to prepare a liquid crystal display device. However, in a liquid crystal display device thus prepared, there is observed a slight difference in liquid crystal alignment state between the region where the liquid crystal enters due to the capillary effect immediately after the application thereof and the region filled with the liquid crystal after restoration to the atmospheric pressure, thus resulting in a recognizable difference in image quality.

If the liquid crystal application is performed in cholesteric phase providing an appropriate viscosity, the entering of the liquid crystal due to the capillary effect immediately after the application can be prevented but, at a temperature corresponding to the cholesteric phase, it is difficult to completely effect the degassing from a liquid crystal panel, particularly a ferroelectric liquid crystal panel having a small cell gap (liquid crystal layer thickness), thus being liable to leave bubbles of residual gas after the injection.

As another problem, in case of production of a ferroelectric liquid crystal panel having a small cell (or panel) gap or a large panel, it is difficult to completely inject the liquid crystal over the entire panel area without forming voids, thus being liable to leave voids in the neighborhood of the sealing member even if no voids are left in the display area. Such a void present outside the display area can move to a display area due to a temperature change of the panel or within a re-alignment step for re-aligning the ferroelectric liquid crystal. Accordingly, it is necessary to completely fill the panel including a region outside the display area.

Further, even if a panel is gradually cooled to room temperature while providing the panel with some temperature difference as described above, it is difficult to completely prevent the occurrence of a void, and such a void can also occur at a low temperature.

SUMMARY OF THE INVENTION

A generic object of the present invention is to provide a process for injecting a ferroelectric liquid crystal having solved the above-mentioned problems.

A more specific object of the present invention is to provide a process for injecting a ferroelectric liquid crystal free from occurrence of a void due to residual gas after the injection and alignment abnormality due to entering of the liquid crystal immediately after the application.

According to the present invention, there is provided a process for injecting a ferroelectric liquid crystal into a liquid crystal panel, comprising at least four steps including:

a first step of reducing a pressure and evacuating gas within the liquid crystal panel, a second step of applying the ferroelectric liquid crystal to an injection port of the liquid crystal panel, a third step of causing the liquid crystal to enter into the liquid crystal panel under an increasing pressure, and a fourth step of completing injection of the liquid crystal into the liquid crystal panel under an elevated pressure, wherein the liquid crystal panel is held at a higher temperature in the first step than in the second step.

These and other objects, features and advantages of the present invention will become more apparent upon a consideration of the following description of the preferred embodiments of the present invention taken in conjunction with the accompanying drawings.

DETAILED DESCRIPTION OF THE INVENTION

In the first step of the process of the present invention, the liquid crystal panel is disposed in a pressure vessel held at a reduced pressure of at most about $10^{-2}$ Torr, preferably at most $10^{-3}$ Torr. At a low degree of vacuum around $10^{-2}$ Torr, a void or bubble can occur in the liquid crystal due to residual gas within the resultant panel. In order to obviate this problem, it is preferred to place after the fourth step a fifth step wherein the liquid crystal panel filled with the liquid crystal is held with its injection port up and immersed, e.g., in cooling water, followed by gradual temperature raising by pulling the liquid crystal panel up into a higher temperature atmosphere. By this treatment, a void or bubble having occurred in the liquid crystal during the injection process under such a relatively low degree of vacuum is discharged and the liquid crystal packing density is further uniformized.

The elevated pressure within the fourth step may be appropriately set depending on the kind of the ferroelectric liquid crystal and the heating temperature and may be on the order of 1.5–4.0 kg/cm$^2$-Gauge while it is not particularly limited.

The respective step in the process according to the present invention may preferably be performed successively or incessantly so as to further improve the effective utilization of the liquid crystal material.

Hereinbelow, a preferred embodiment of the present invention is described with reference to the drawings.

Figure 1:
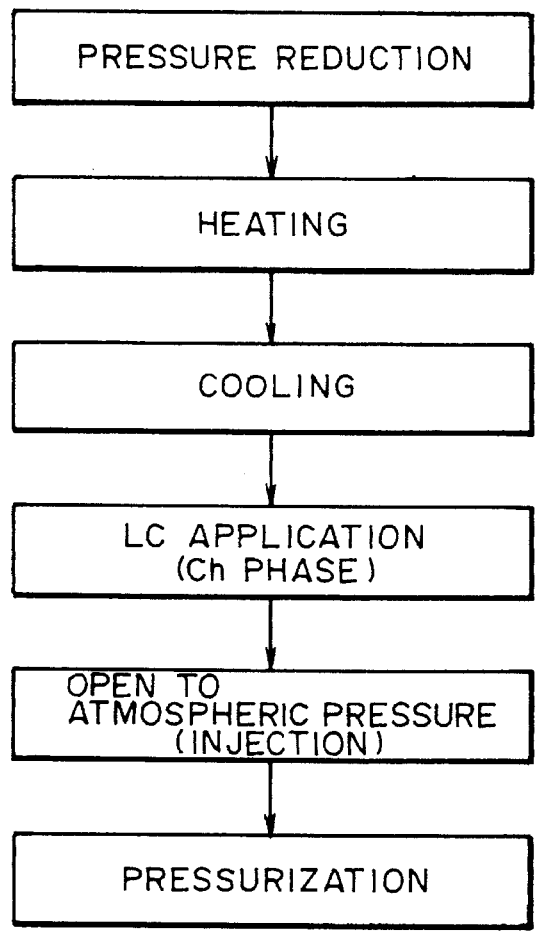
FIG. 1 is a flow chart of the injection process according to the invention.

FIG. 1 is a flowchart indicating the steps involved in an e embodiment of the injection process according to the present invention. In a first step, a liquid crystal material and a liquid crystal panel are held in a pressure vessel and a reduced pressure is set up within the vessel. Then, the interior of the vessel is heated so as to sufficiently degas the interior of the liquid crystal panel. A higher heating temperature at this time provides a higher degassing effect within an extent of not adversely affecting the structure and constituting elements of the liquid crystal panel. The temperature may preferably be at least 110° C.

In a subsequent step, the interior of the vessel is cooled to and controlled at a substantially constant temperature where the liquid crystal to be injected into the liquid crystal panel maintains cholesteric phase, and then the liquid crystal material is applied at the injection port of the liquid crystal panel. Ordinarily, only a small amount of the liquid crystal material is applied so that the temperature thereof can be almost the same as the liquid crystal panel temperature on application thereof. Accordingly, the temperature of the liquid crystal material before the application need not be seriously controlled but may preferably be controlled at a temperature similar to that of the liquid crystal panel.

Figure 5A:
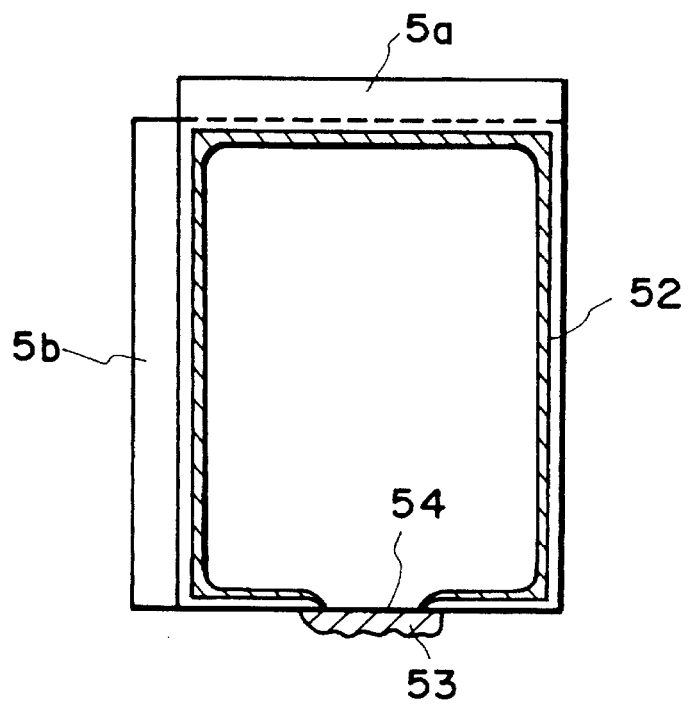
FIG. 5A illustrates a state of a liquid crystal material on application thereof to a liquid crystal panel according to the process of the invention.

FIG. 5A shows a state of the liquid crystal panel and the liquid crystal material immediately after the application of the liquid crystal material. The liquid crystal panel includes substrates 5a and 5b, a sealing member 52 and an injection port 54, on which a liquid crystal material 53 is applied. As shown in FIG. 5A, the liquid crystal material 53 applied is in the cholesteric phase so that it has an appropriate viscosity and is attached to the injection port 54 while wholly covering the injection port and without entering into the liquid crystal panel due to the capillary effect.

Then, the panel is subjected to an increasing pressure, e.g., open to the atmospheric pressure as shown at the last of FIG. 1, to inject the liquid crystal material into the liquid crystal panel due to a pressure difference between the pressure within the panel and the increasing pressure (atmospheric pressure). In this instance, as the interior of the liquid crystal panel has been fully degassed, the liquid crystal material is injected into the panel without leaving any bubble.

Then, in a subsequent step, an elevated pressure is gradually applied to the liquid crystal panel to further increase the packing density of the liquid crystal material within the panel, thus accomplishing complete injection free from occurrence of voids.

Hereinbelow, the present invention will be described more specifically based on Examples and Comparative Examples.

Example 1

Figure 2:
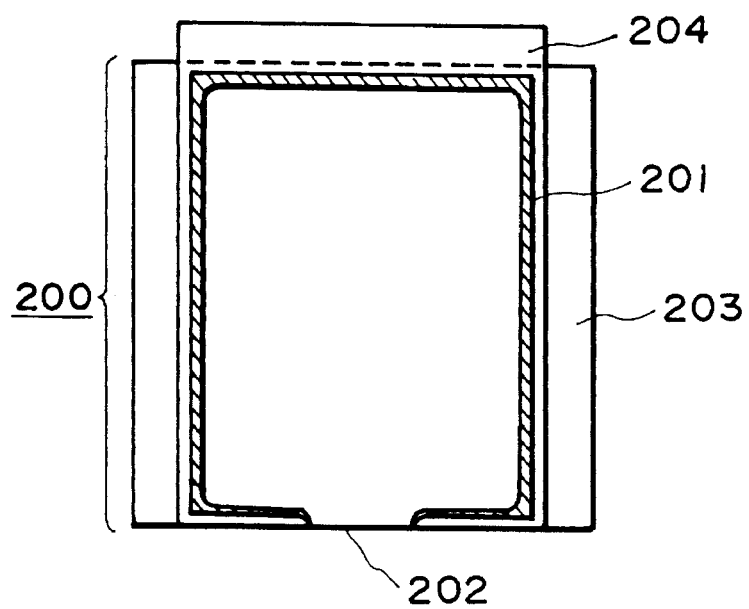
FIG. 2 is an illustration of a liquid crystal panel to be filled with a liquid crystal according to the process of the invention.

A ferroelectric liquid crystal was injected into a blank liquid crystal panel of 310 mm×270 mm in size having a cell gap of 1.5 µm as shown in FIG. 2 according to the present invention.

The blank panel 200 included a pair of opposite electrode plates 203 and 204 disposed with a prescribed gap and with a sealing member 201 therebetween while leaving an injection port 202 of 80 mm×1.5 µm. The inner, mutually opposite surfaces of the electrode plates 203 and 204 had been subjected to a prescribed aligning treatment.

Figure 3:
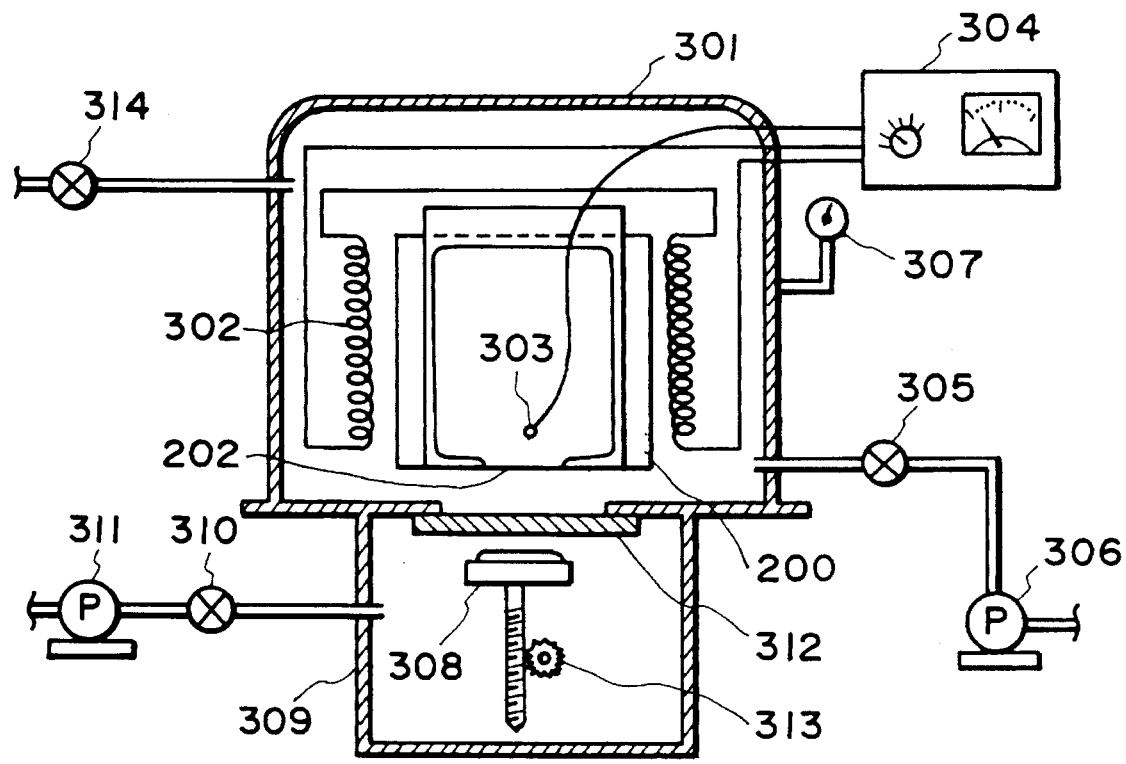
FIG. 3 is an illustration of an injection apparatus used for practicing the invention.

The panel 200 was set in an injection apparatus as shown in FIG. 3. As a first step, the panel 200 was set within a pressure vessel 301 with its injection port 202 down, and the surrounding temperature was controlled at 120° C. by controlling a surrounding heater 302 by a temperature controller 304 based on the measured data from the temperature sensor 303. Then, a valve 305 was opened to evacuate the pressure vessel 301 by a vacuum pump 306 for 12 hours until the pressure within the vessel 301 was lowered down to $10^{-3}$ Torr as a reading of a pressure gauge 307.

On the other hand, within a liquid crystal chamber 309, a smectic liquid crystal was placed on an applicator 308, and a valve 310 was opened to evacuate the chamber 309 by a vacuum pump 311. When the pressure was lowered to $10^{-3}$ Torr, the heater 302 was turned off to naturally cool the liquid crystal panel 200 down to 83° C., where the liquid crystal assumed cholesteric phase.

The liquid crystal material used in this Example was a pyrimidine-based mixture liquid crystal showing the following phase transition series:

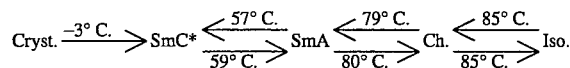

Cryst.: crystal phase, SmC*: chiral smectic C phase,
SmA: smectic A phase, Ch.: cholesteric phase,
Iso.: isotropic phase.

Then, as a second step, a gate valve 312 between the pressure vessel 301 and the liquid crystal chamber 309 was opened, and the applicator 308 was raised by means of an elevator mechanism 313 to apply the liquid crystal material thereon so as to completely cover the injection port 202 of the liquid crystal panel 200. At this time, the entering of the liquid crystal material into the liquid crystal panel 200 was not observed as described with reference to FIG. 5A.

Then, as a third step, the two valves 305 and 310 were closed to stop the evacuation, and a leak valve 314 was gradually opened to introduce N$_2$ gas to restore the atmospheric pressure within the pressure vessel 301. At this time, the heater 302 had been re-energized under the same condition to keep the smectic liquid crystal in the isotropic phase. As a result, the liquid crystal material having a low viscosity was caused to enter into and proceed within the liquid crystal panel. After 72 hours, the heater 303 was turned off and the liquid crystal panel was allowed to cool to room temperature. The liquid crystal packing state within the liquid crystal panel in this state was observed, whereby the presence of a void remaining in the neighborhood of the sealing member was confirmed.

Subsequently, as a fifth step, the heater 302 was re-energized so as to provide a surrounding temperature of 120° C. and a high-pressure $N_2$ gas was introduced through the valve 314 to keep a pressure of 2.5 kg/cm²-Gauge within the pressure vessel 301, so that the resultant conditions were maintained for 6 hours. Thereafter, the interior within the pressure vessel 301 was restored to the atmospheric pressure and the heater 302 was turned off to allow the liquid crystal panel to cool to room temperature, whereby the void in the neighborhood of the sealing member disappeared and the panel was completely filled with the liquid crystal.

Thereafter, the injection port 202 of the liquid crystal panel was sealed with a room temperature-hardenable epoxy adhesive ("LIXON BOND", mfd. by Chisso K.K.), whereby the production of the panel was completed.

The thus-prepared liquid crystal panel was left standing at −20° C. for 24 hours and then restored to room temperature, followed by observation of the liquid crystal packing state within the panel, whereby no void was observed in the display area or in the neighborhood of the sealing member. The results are summarized in Table 1 appearing hereinafter.

Further, the liquid crystal alignment within the panel was uniform and a particularly good and uniform alignment was realized in the display area.

Example 2

A ferroelectric liquid crystal panel was prepared in the same manner as in Example 1 except that the reduced pressure within the pressure vessel 301 and the liquid crystal chamber 309 was changed to $10^{-2}$ Torr.

When the liquid crystal packing state of the panel in a stage after the fourth step, slight voids were found to remain in the display area and in the neighborhood of the sealing member.

In this Example, the liquid crystal panel was placed in a cooling and heating apparatus shown in FIG. 4 and subjected to a fifth step as follows.

Figure 4:
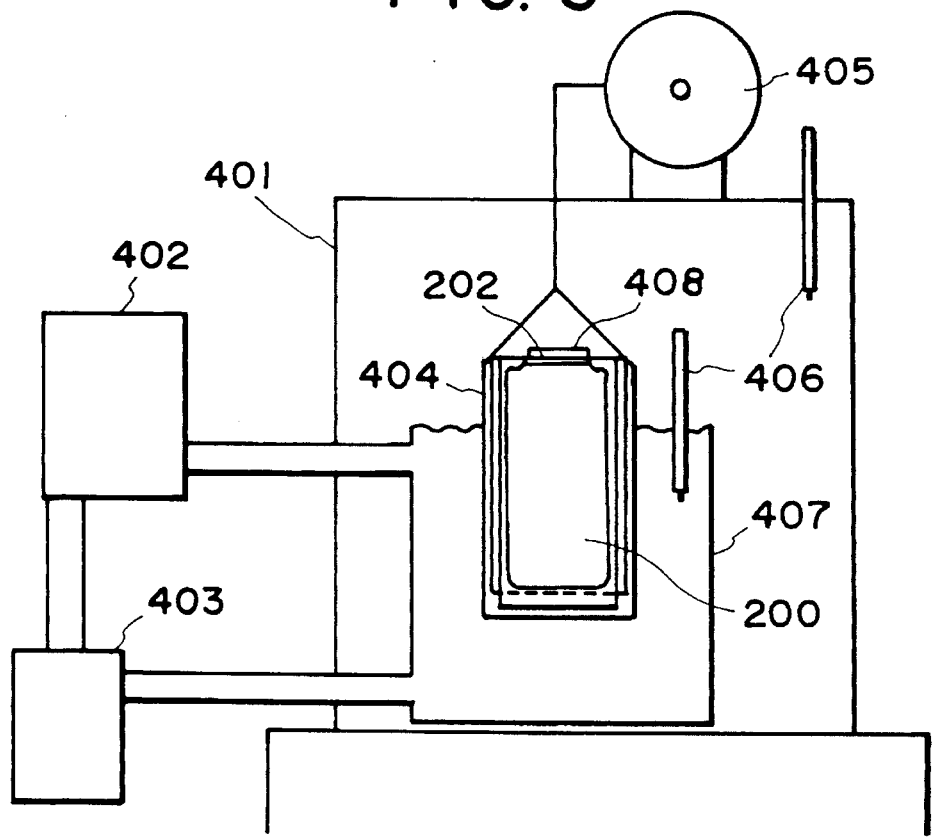
FIG. 4 is an illustration of a cooling and heating apparatus used for practicing the invention.

Referring to FIG. 4, the cooling and heating apparatus included a thermostat vessel 401, a cooler 402 for cooling circulating water, a pump 403 for circulating cooling water, a panel-holding member 404, an elevator mechanism 405 for pulling up and down the panel-holding member 404, a thermometer 406, and a water vessel 407 for cooling the panel-holding member 404.

By using the apparatus, the liquid crystal panel 200 prepared above and retaining an excessively applied portion 408 of the liquid crystal material on the injection port 202 was set on the panel-holding member 404 so that the injection port 202 was up. Then, the liquid crystal panel 200 was wholly dipped within cooling water in the water vessel 407 and the cooling water temperature was held at 15° C. while keeping the temperature within the thermostat vessel 401 at 95° C.

Then, the liquid crystal panel 200 was gradually pulled up from the cooling water at a rate of 0.2 mm/min. by the elevator mechanism 305, so that a high temperature region of the liquid crystal panel 200 was gradually enlarged from the side of the injection port 202 connected with the excessive liquid crystal 408 until the whole body of the liquid crystal panel 200 was pulled out of the cooling water. The liquid crystal packing state within the panel in this state was observed, whereby the voids confirmed previously was not recognized at all, and thus the voids or bubbles could be discharged.

Thereafter, the injection port 202 of the liquid crystal panel was sealed with a room temperature-hardenable epoxy adhesive ("LIXON BOND", mfd. by Chisso K.K.), whereby the production of the panel was completed.

The thus-prepared liquid crystal panel was left standing at −20° C. for 24 hours and then restored to room temperature, followed by observation of the liquid crystal packing state within the panel, whereby the liquid crystal alignment within the panel was uniform similarly as in Example 1 and no void was observed in the display area or in the neighborhood of the sealing member. The results are also summarized in Table 1 appearing hereinafter.

Comparative Example 1

The first step of the liquid crystal injection process of Example 1 was repeated by using the same apparatus and liquid crystal material as in Example 1. Thereafter, in the second step, the liquid crystal material was applied onto the injection port of the liquid crystal panel while the panel temperature was maintained at 120° C. where the liquid crystal assumed the isotropic phase.

Figure 5B:
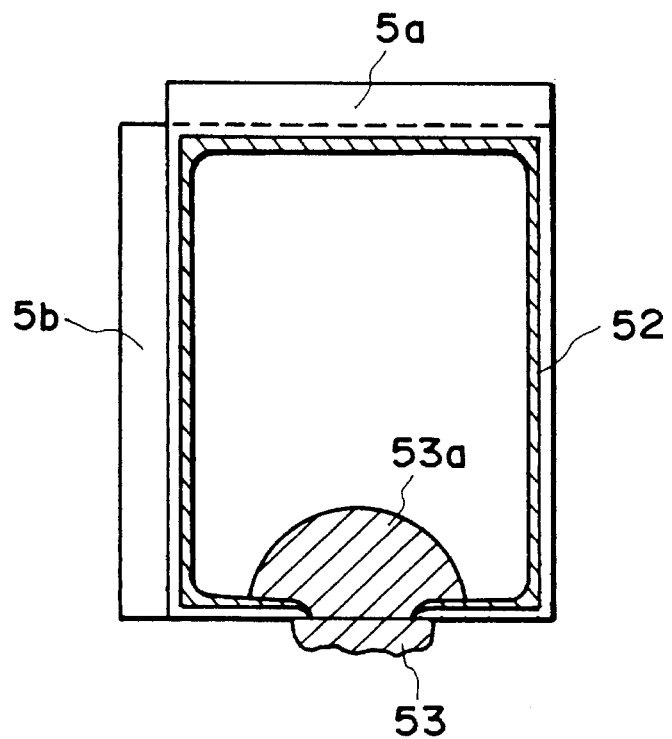
FIG. 5B illustrates a state of a liquid crystal material on application thereof according to a conventional process of Comparative Example 1 described hereinafter.

The appearance of the liquid crystal panel and the liquid crystal material immediately after the application was as illustrated in FIG. 5B compared with FIG. 5A. As shown in FIG. 5B, the liquid crystal material 53 on application entered up to a position 53a due to the capillary effect because the liquid crystal material was in the isotropic phase showing a low viscosity at 120° C.

Thereafter, the steps of Example 1 were similarly repeated to complete the injection. In the resultant ferroelectric liquid crystal panel, however, there was observed an alignment abnormality in the region of from the injection port to the position 53a in FIG. 5B.

Comparative Example 2

A ferroelectric liquid crystal panel was prepared by injection in the same manner as in Comparative Example 1 except that liquid crystal panel was held at 84° C. corresponding to the cholesteric phase of the liquid crystal material throughout the first and second steps so as not to cause the liquid crystal material to enter within the panel immediately after the application. As a result, the gas evacuation from the liquid crystal panel was insufficient, so that some residual gas remained within the panel even after the restoration to the atmospheric pressure (third step), whereby the injection of the liquid crystal material could not be completed.

Comparative Example 3

The liquid crystal injection process of Example 1 was repeated up to the third step and then, without the fourth step, the same step as the fifth step as in Example 2 was effected on the liquid crystal panel, followed by sealing of the injection port in the same manner to prepare a ferroelectric liquid crystal panel. During the process, the liquid crystal alignment state and packing state were observed before and after the fifth step.

Further, the thus-prepared liquid crystal panel was left standing at −20° C. for 24 hours, then restored to room temperature and then observed with respect to the liquid crystal packing state in the same manner as in Example 1.

As a result, the alignment abnormality attributable to the capillary effect immediately after the liquid crystal application was not observed, but voids were observed both in the display area and in the neighborhood of the sealing member immediately before the fifth step and voids remained in the neighborhood of the sealing member even after the fifth step treatment due to omission of the fourth step. Further, after the standing at −20° C., the voids having disappeared after the fifth step appeared again in the display area.

From the above results, it is understood that the fourth step is effective in perfecting the injection in the neighborhood of the sealing member, increasing the packing density of the liquid crystal and preventing the occurrence of voids at a low temperature.

The above results are also summarized in Table 1 below.

TABLE 1

| | Packing state of liquid crystal in the panel (presence or absence of voids) | | | | | |
|---|---|---|---|---|---|---|
| | Before 5th step (after 4th step) | | After 5th step | | After standing at −20° C. | |
| | Near the seal | Display area | Near the seal | Display area | Near the seal | Display area |
| Example 1 | none | none | — | — | none | none |
| Example 2 | voids | voids | none | none | none | none |
| Comp. Example 3 | voids | voids | voids | none | voids | voids |

As described above, according to the process for injecting a ferroelectric liquid crystal into a panel of the present invention, it is possible to prevent the entering of a liquid crystal material conventionally observed after application onto the liquid crystal injection port of the panel and realize a higher degree of packing of liquid crystal material in the panel than by the conventional process. As a result, it is possible to provide a high-quality ferroelectric liquid crystal panel which is free from alignment abnormality and free from occurrence of voids within the panel even after standing at a low temperature. Thus, it is possible to realize a liquid crystal panel which is highly reliable.

What is claimed is:

1. A process for injecting a liquid crystal showing cholesteric and smectic phases into a liquid crystal panel, comprising:

a first step of reducing pressure within the liquid crystal panel, a second step of applying the liquid crystal to an injection port of the liquid crystal panel, said liquid crystal panel being maintained at a predetermined pressure, a third step of causing the liquid crystal to enter into the liquid crystal panel under increasing pressure, and a fourth step of completing injection of the liquid crystal into the liquid crystal panel under a pressure higher than atmospheric pressure, wherein the liquid crystal panel is held at a higher temperature in the first step than in the second step.

2. A process according to claim 1, further including a fifth step of cooling and then gradually heating the liquid crystal panel after the fourth step.

3. A process according to claim 2, wherein said steps are performed successively.

4. A process according to claim 1, wherein the liquid crystal is held at a temperature corresponding to said cholesteric phase of the liquid crystal during the second step.

5. A process according to claim 1, wherein said steps are performed successively.

6. A process according to claim 1, wherein the liquid crystal panel is heated to a temperature of at least 110° C. in the first step and then cooled to a temperature corresponding to said cholesteric phase of the liquid crystal prior to said second step.

* * * * *

UNITED STATES PATENT AND TRADEMARK OFFICE
CERTIFICATE OF CORRECTION

PATENT NO. : 5,548,428

DATED : August 20, 1996

INVENTORS : YUICHI MASAKI ET AL.

It is certified that error appears in the above-identified patent and that said Letters Patent is hereby corrected as shown below:

ON TITLE PAGE

In [56] References Cited, under FOREIGN PATENT DOCUMENTS:

"64-31118   2/1989   Japan" should read -- 1-31118--.
2/1989   Japan--.

COLUMN 3

Line 32   "e" should be deleted.

Signed and Sealed this

Fourteenth Day of January, 1997

Attest:

BRUCE LEHMAN

Attesting Officer            Commissioner of Patents and Trademarks